United States Patent [19]
Yin et al.

[11] Patent Number: 5,606,433
[45] Date of Patent: Feb. 25, 1997

[54] LAMINATION OF MULTILAYER PHOTOPOLYMER HOLOGRAMS

[75] Inventors: Khin S. Yin, Alhambra; Kevin H. Yu, Temple City; John E. Wreede, Azusa, all of Calif.

[73] Assignee: Hughes Electronics, Los Angeles, Calif.

[21] Appl. No.: 298,888

[22] Filed: Aug. 31, 1994

[51] Int. Cl.$^6$ .................................................. G03H 1/00
[52] U.S. Cl. .................................. 359/1; 359/3; 359/24; 359/900
[58] Field of Search ..................... 359/1, 3, 14, 15, 359/24; 430/1, 2

[56] References Cited

U.S. PATENT DOCUMENTS

| | | | |
|---|---|---|---|
| 4,822,651 | 4/1989 | Newsom | 428/36.8 |
| 4,965,152 | 10/1990 | Keys et al. | 430/1 |
| 4,975,311 | 12/1990 | Lindgren | 428/156 |
| 5,103,323 | 4/1992 | Magarinos et al. | 359/8 |
| 5,182,180 | 1/1993 | Gambogi, Jr. et al. | 430/1 |
| 5,360,501 | 11/1994 | Bolt | 156/101 |

*Primary Examiner*—Paul M. Dzierzynski
*Assistant Examiner*—Darren E. Schuberg
*Attorney, Agent, or Firm*—Leonard A. Alkov; Wanda K. Denson-Low

[57] ABSTRACT

A process for making a multilayer photopolymer hologram structure without intervening adhesive layers between component photopolymer layers. The process includes the steps of exposing a first photopolymer recording layer to hologram forming light, exposing the holographically exposed first photopolymer recording layer to UV light to partially UV harden the first photopolymer recording layer, exposing a second photopolymer recording layer to hologram forming light, exposing the holographically exposed second photopolymer recording layer to UV light for a time interval that is sufficiently short to preserve the tackiness of the second photopolymer recording layer, laminating the second photopolymer recording layer onto the first photopolymer recording layer to form a laminar photopolymer structure having top and bottom photopolymer surfaces, baking the laminar photopolymer structure while subjecting the top and bottom surfaces thereof to the uniform pressure, and exposing the laminar photopolymer structure to UV light.

4 Claims, 3 Drawing Sheets

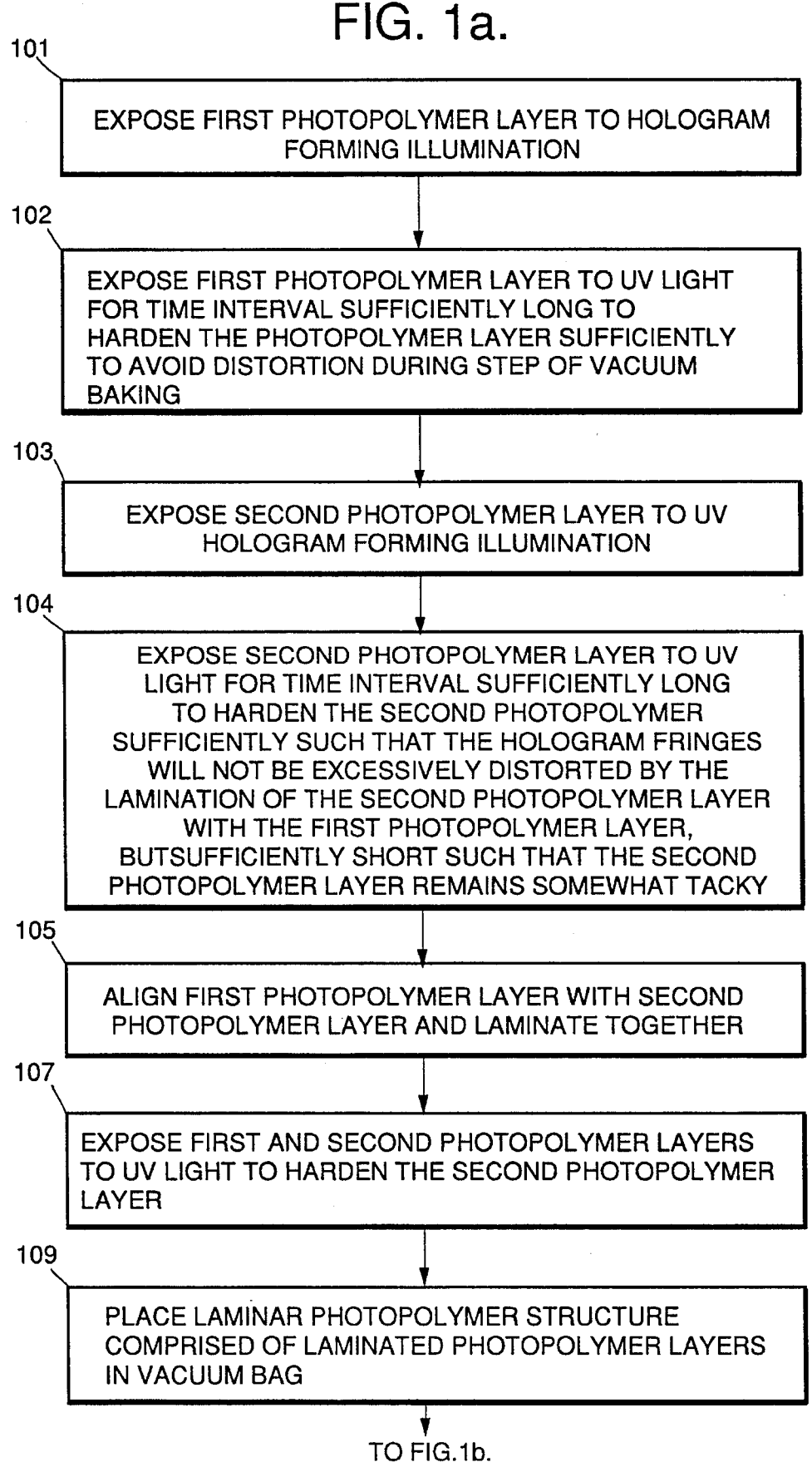

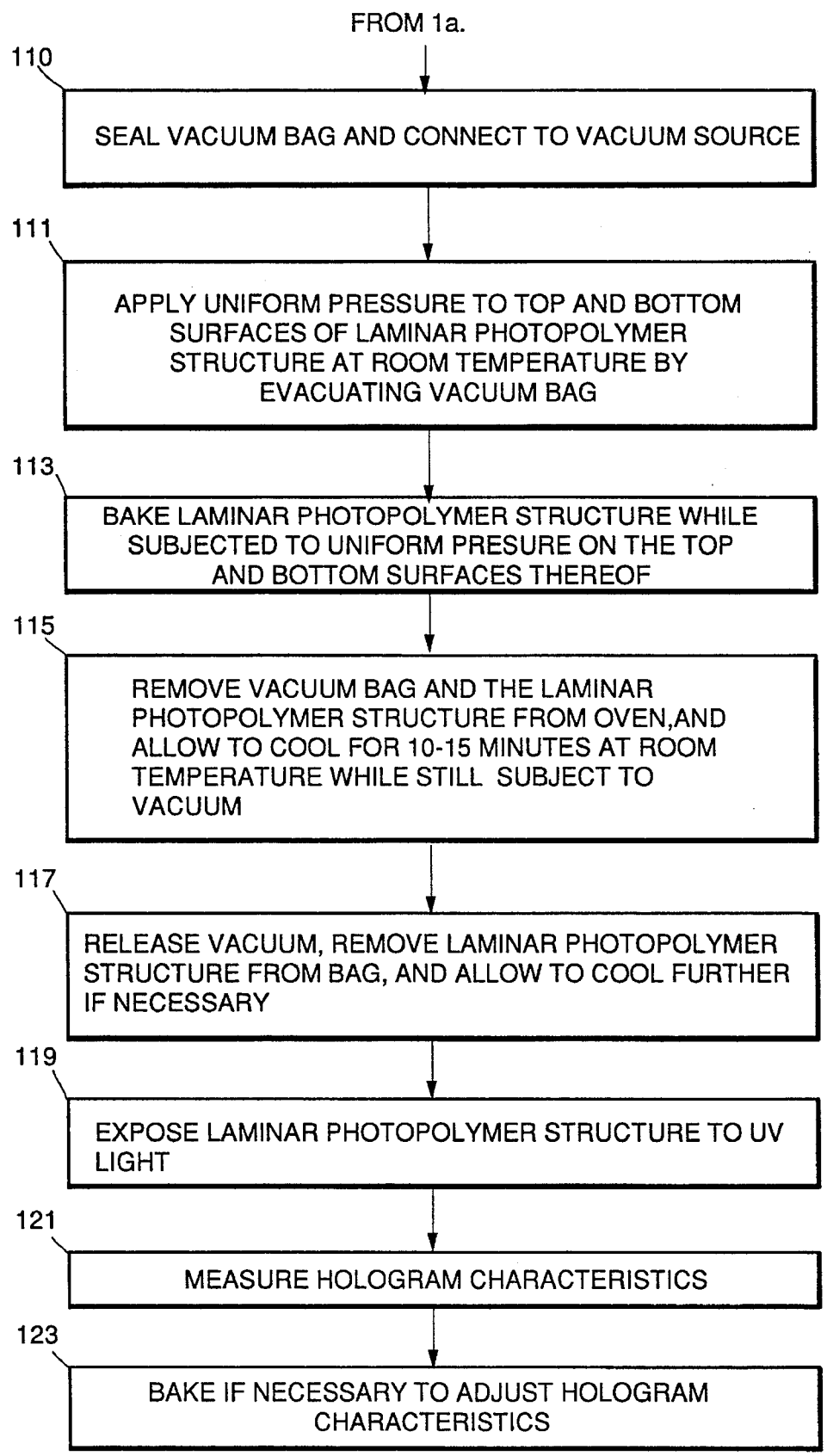

LAMINATION OF MULTILAYER PHOTOPOLYMER HOLOGRAMS

BACKGROUND OF THE INVENTION

The subject invention is generally directed to multilayer photopolymer holograms, and more particularly to a multilayer photopolymer hologram structure that is comprised of a plurality of photopolymer layers laminarly attached to each other without intervening adhesive layers.

In a number of applications such as laser eye protection and head-up displays, the desired holographic effect might not be capable of being optimally achieved with a single hologram, for example as a result of bandwidth requirements. In such applications, a plurality of hologram layers, each configured to provide a portion of the desired hologram effect, can be laminarly attached to each other. However, a consideration with known multilayer hologram structures is the use of adhesive layers, which adds to the thickness of the multilayer hologram structures and can result in distortion of the hologram layers as well as distortion of the composite holographic image produced thereby. The problems of distortion and blurring can be particularly critical for a deep hologram that produces an image relatively far way from the hologram plane.

SUMMARY OF THE INVENTION

It would therefore be an advantage to provide a multilayer photopolymer hologram structure that does not include adhesive layers between the component hologram layers.

Another advantage would be to provide a multilayer photopolymer hologram structure having reduced distortion of the component hologram layers and reduced distortion of the composite holographic image produced by the hologram layers.

The foregoing and other advantages are provided by the invention in a process that includes the steps of exposing a first photopolymer recording layer to hologram forming light, exposing the holographically exposed first photopolymer recording layer to UV light to partially harden the holographically exposed first photopolymer recording layer, exposing a second photopolymer recording layer to hologram forming light, exposing the holographically exposed second photopolymer recording layer to UV light for a time that is sufficiently short to preserve the tackiness of the second photopolymer recording layer but long enough to sufficiently harden the second photopolymer layer to prevent distortion in the following step of laminating, laminating the second photopolymer recording layer onto the first photopolymer recording layer to form a laminar photopolymer structure having a top photopolymer surface and a bottom photopolymer surface, baking the laminar photopolymer structure while subjecting the top and bottom surfaces thereof to uniform pressure, and exposing the laminar photopolymer structure to UV light to completely UV cure the laminated first and second photopolymer layers.

BRIEF DESCRIPTION OF THE DRAWINGS

The advantages and features of the disclosed invention will readily be appreciated by persons skilled in the art from the following detailed description when read in conjunction with the drawing wherein:

FIGS. 1a and 1b set forth a flow diagram of a procedure in accordance with the invention.

DETAILED DESCRIPTION OF THE DISCLOSURE

Figure 2:
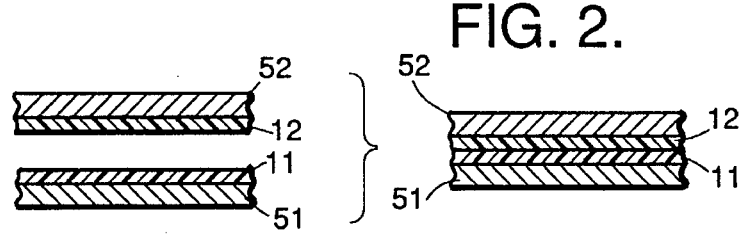
FIG. 2 schematically depicts lamination of two photopolymer layers in accordance with the procedure of FIGS. 1a and 1b.

In the following detailed description and in the several figures of the drawing, like elements are identified with like reference numerals.

Referring now to FIGS. 1a and 1b, set forth therein is a process flow of a procedure in accordance with the invention for making a multilayer hologram structure from a first photopolymer layer 11 and a second photopolymer layer 12, which are schematically illustrated in FIG. 2 together with respective cover sheets 51, 52 respectively attached thereto. Preferably, the photopolymer layers comprise a volume phase photopolymer. At 101 the first photopolymer layer 11 is exposed to hologram forming illumination, and at 102 the holographically exposed first photopolymer layer is partially UV hardened by exposure to UV light for a time interval that is sufficiently long to harden the photopolymer sufficiently such that the hologram fringes therein will not be excessively distorted by the pressure baking described further herein. The threshold of excessive distortion would depend, of course, on the particular application and the hologram type. By way of illustrative example, the first photopolymer layer can be partially UV hardened to the extent of eliminating the tackiness of the photopolymer layer, which may make lamination with the second photopolymer layer easier. For example, the holographically exposed first photopolymer layer could be exposed for about 15 minutes to UV light having a 360–410 nm peak wavelength and an intensity of about 5 mw/cm$^2$, which can be provided by a Douthitt Co. Model AL15 750 watt Hg Halide lamp.

At 103 the second photopolymer layer 12 is exposed to hologram forming illumination, and at 104 the holographically exposed second photopolymer layer is exposed to UV light for a time interval that is sufficiently long to harden the photopolymer sufficiently such that the hologram fringes will not be excessively distorted by the lamination of the second photopolymer layer with the first photopolymer layer as described further herein, but sufficiently short such that the second photopolymer layer remains somewhat tacky. The threshold of excessive distortion would depend, of course, on the particular application. The UV exposure, which also deactivates the photopolymer, can be achieved, for example, by exposing the second photopolymer layer to ambient white light for a time interval of about 15 to 45 minutes. At 105 the second photopolymer layer 12 is aligned with the first photopolymer layer 11 and laminated thereto to form a photopolymer to photopolymer lamination wherein the second photopolymer layer is in direct laminar contact with the first photopolymer layer, with the cover sheets on the outside of the resulting laminar photopolymer structure which includes a top photopolymer surface and a bottom photopolymer surface which are against the inside surfaces of the top and bottom cover sheets. This can be achieved, for example, by placing one of the photopolymer layers and its attached cover sheet on top of a glass plate that overlies an alignment template, with the cover sheet against the glass plate. The other photopolymer layer is then squeegeed onto the photopolymer layer already on the glass plate in an aligned manner, with the photopolymer layers against each other such that the cover sheet for the overlying photopolymer layer is on top of the laminar structure comprised of the first and second photopolymer layers and their cover sheets. For example, one edge of the second photopolymer layer is aligned with a corresponding edge of the first photopolymer layer, and the two layers are squeegeed together. At 107 the first and second photopolymer layers are exposed to UV light to sufficiently UV harden the second photopolymer layer so that the hologram fringes therein will not be excessively distorted by the pressure baking described further herein. For example, the UV illumination can be directed through the top cover sheet if the layers are laminated on a glass plate as described earlier.

At 109 the laminar assembly comprised of the laminar photopolymer layers and the cover sheets attached thereto is placed in a static free flat vacuum bag, with the planar extent of the laminar assembly being oriented similarly to the flat sides of the flat vacuum bag, and in such a manner as to avoid wrinkles in the laminar photopolymer structure. At 110 the bag is sealed and connected to a vacuum source.

The vacuum bag is comprised of a material capable of withstanding the heat required to bake the photopolymer layers, and should have having relatively stiff but thin flat sides in the order of about 5 mils, so that when the bag is evacuated, only the flat sides of the bag can press against the laminar assembly comprised of the laminated photopolymer layers and the top and bottom cover sheets, and in particular only against the top and bottom cover sheets. In other words, the top and bottom flat sides of the bag are sufficiently stiff to avoid distortion causing collapse of the flat sides of the bag against the edges of the laminar assembly when the bag is evacuated. As a further measure for avoiding distortion to the photopolymer layers, the edges of the vacuum bag can be taped to a flat support surface if desired.

At 111 the top and bottom surfaces of the photopolymer laminar structure comprised of the laminated first and second photopolymer layers are subjected to a uniform pressure by evacuation of the vacuum bag to a vacuum of about 29 inches of mercury so as to provide a maximum pressure differential of about 15 psi, which is the maximum uniform pressure to which the laminar photopolymer structure is subjected. By way of illustrative example, the laminar photopolymer structure is subjected to vacuum at room temperature for a time interval approximately equal to the sum of (a) the time required to achieve the maximum vacuum of 29 inches of mercury, and (b) 5 minutes. At 113 the laminar photopolymer structure is baked in an oven at about 105° C. for about two hours while in the vacuum bag and while the vacuum continues to be applied to the vacuum bag to maintain the maximum vacuum of about 29 inches of mercury. While vacuum baking, the assembly comprised of the vacuum bag and the photopolymer layers contained therein should be on a flat surface with the edges of the vacuum bag held down.

At 115 the vacuum bag and the laminar photopolymer structure are removed from the oven, and allowed to cool for 10–15 minutes at room temperature while still be subjected to vacuum. At 117 vacuum is released from the vacuum bag, and the laminar assembly comprised of the laminar photopolymer structure and the top and bottom cover sheets is removed from the vacuum bag and allowed to cool further if necessary. For example, the edges of the vacuum bag are cut and the bag surfaces are peeled from the laminar assembly. At 119 the laminar photopolymer structure is exposed to UV light for about 2 hours to bleach the residual dye from the unexposed regions of the photopolymer layers. At 121 the hologram characteristics, such as efficiency, bandwidth and/or Bragg angle, as appropriate, of the laminar photopolymer structure are measured, and if necessary the laminar photopolymer structure is further baked at ambient pressure to increase efficiency and/or to adjust wavelength.

After the laminar photopolymer structure comprised of the first and second photopolymer layers is appropriately baked, the resulting multilayer photopolymer hologram structure is ready for application to an appropriate substrate such as a windshield, for example, by removal of one of the cover sheets, as appropriate, and application of the uncovered photopolymer surface to an adhesive that has been pre-applied to the substrate.

Figure 3:
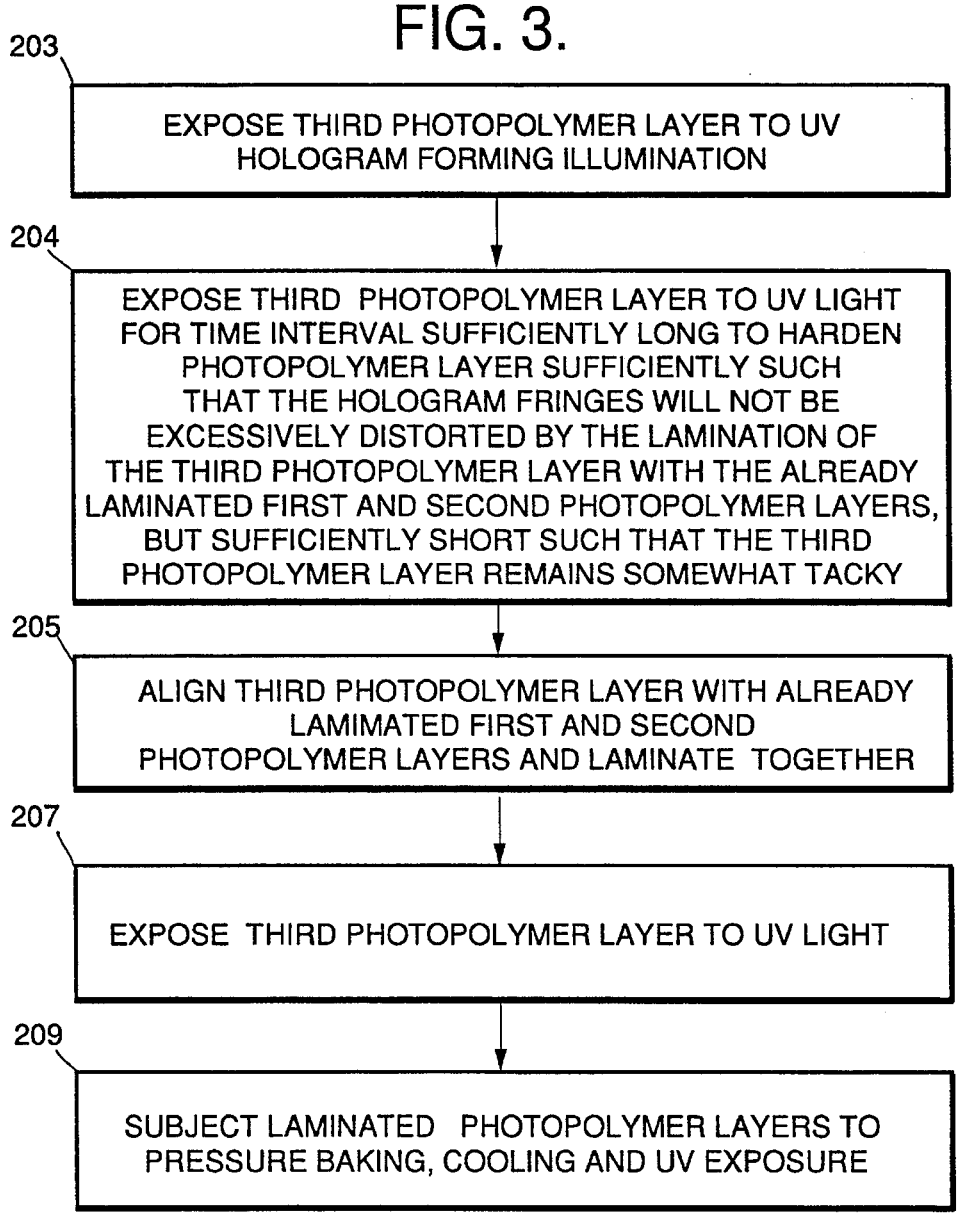
FIG. 3 is flow diagram that sets forth a further procedure in accordance with the invention.
Figure 4:
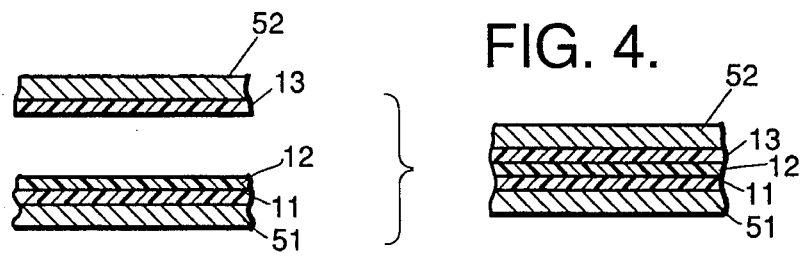
FIG. 4 schematically depicts lamination of photopolymer layers in accordance with the procedure of FIG. 3.

The invention further contemplates multiple layers greater than two, which can be achieved by (1) laminating a partially UV hardened but still tacky holographically exposed photopolymer layer onto a two layer photopolymer structure that has been assembled and baked in accordance with the foregoing, and (2) processing the three layer photopolymer structure in the same manner as the two layer structure, and (3) individually repeating the steps of laminating and processing for each partially UV hardened but still tacky holographically exposed to be added onto the already processed multiple layer photopolymer structure. Referring in particular to FIG. 3, set forth therein is a process flow of a procedure in accordance with the invention for making a multilayer hologram structure from (a) a first photopolymer layer 11 and a second photopolymer layer 12 that have been laminated and processed as described above, and (b) a third photopolymer layer 13, all of which are schematically illustrated in FIG. 4 together with a cover sheet 53 that is attached to the third photopolymer layer 13. At 203 the third photopolymer layer 13 is exposed to hologram forming illumination, and at 204 the third photopolymer layer is exposed to UV light for partial UV hardening for a time interval that is sufficiently long to harden the photopolymer layer sufficiently such that the hologram fringes will not be excessively distorted by the lamination of the third photopolymer layer with the already laminated first and second photopolymer layers, but sufficiently short such that the third photopolymer layer remains somewhat tacky. At 205 the third photopolymer layer 11 is aligned with the already laminated first and second photopolymer layers 11, 12 and is laminated thereto to form a photopolymer to photopolymer lamination wherein the third photopolymer layer is in direct laminar contact with the appropriate one of the first and second photopolymer layers, with the cover sheets on the outside of the resulting three layer laminar photopolymer structure. This can be achieved, for example, by removing one of the cover sheets from the already processed first and second photopolymer layers, as appropriate to uncover the already processed photopolymer layer that is to be contiguously affixed to the third photopolymer layer, placing the already processed photopolymer layers on top of a glass plate that overlies an alignment template, with the remaining cover sheet against the glass plate. The third photopolymer layer is then squeegeed onto the uncovered already processed photopolymer layer in an aligned manner, with the third photopolymer layer against the uncovered already processed photopolymer layer such that the cover sheet for the third photopolymer layer is on top of the laminar photopolymer structure comprised of the first, second and third photopolymer layers and two cover sheets, as shown in FIG. 4 for the particular example wherein the third photopolymer layer is contiguous to the already processed second photopolymer layer. For example, one edge of the third photopolymer layer is aligned with a corresponding edge of the first or second photopolymer layer, and the third photopolymer layer is squeegeed onto the uncovered already processed photopolymer layer. At 207 the first, second and third photopolymer layers are exposed to UV light to sufficiently UV harden the third photopolymer layer so that the hologram fringes therein will not be excessively distorted by the pressure baking described further herein. For example, the UV illumination can be directed through the cover sheet 16 for the third hologram layer if the layers are laminated on a glass plate as described earlier. At 209, the laminar assembly comprised of the first, second, and third photopolymer layers and the outer cover sheets are subjected to uniform pressure, pressure baked, cooled, UV cured, measured as to hologram characteristics, and baked as necessary to adjust the hologram characteristics, as described earlier with respect to the processing of the first and second photopolymer layers. The resulting multilayer photopolymer hologram structure is now ready for application to an appropriate substrate such as a windshield, for example, by removal of one of the cover sheets, as appropriate, and attaching the uncovered photopolymer layer to the substrate with an adhesive.

Effectively, photopolymer layers are laminated in accordance with the invention by laminating a holographically exposed and partially processed photopolymer layer that is still tacky onto an exposed and at least partially hardened photopolymer layer that does not need to be tacky, so as to form a photopolymer to photopolymer lamination wherein the still tacky photopolymer layer is in direct laminar contact with the at least partially hardened photopolymer layer. The laminar photopolymer structure, which can include previously laminated and completely hardened photopolymer layers, is then exposed to UV light to further harden the still tacky partially UV hardened photopolymer layer, baked while uniform pressure is applied to the top and bottom surfaces of the laminated photopolymer layers (for example by application of pressure to top and bottom cover sheets secured to the top and bottom surfaces), cooled, de-pressurized and then UV bleached. It should be appreciated that the application of uniform pressure to the top and bottom surfaces of the laminar photopolymer structure can be achieved by mechanisms other that vacuum bagging, for example, by baking the laminar hologram structure in an autoclave (essentially a pressurized oven). Baking in an autoclave would subject all outer surfaces of the laminar photopolymer structure to uniform pressure, but should have little if any distorting effects resulting from pressure on the outer surfaces of the edges of the photopolymer layers since the surface area of the edges is quite small and since the pressure is uniform. For autoclaving, the laminar hologram structure can be placed in a vacuum bag, which is not sealed or evacuated, for ease of handling. Alternatively, if greater pressure is desired, the vacuum bag can be evacuated while being autoclaved.

The foregoing has been a disclosure of technique for making a multilayer photopolymer hologram structure that does not contain adhesives between the component photopolymer layers thereof, and thus advantageously avoids distortions due to adhesive layers and provides for thinner hologram structures.

Although the foregoing has been a description and illustration of specific embodiments of the invention, various modifications and changes thereto can be made by persons skilled in the art without departing from the scope and spirit of the invention as defined by the following claims.

What is claimed is:

1. A process for making a multilayer photopolymer hologram structure comprising:
    (a) exposing a first photopolymer recording layer to hologram forming light;
    (b) exposing the holographically exposed first photopolymer recording layer to UV light to partially UV harden the photopolymer recording layer;
    (c) exposing a second photopolymer recording layer to hologram forming light;
    (d) exposing the holographically exposed second photopolymer recording layer to UV light for a time interval that is sufficiently short to maintain the tackiness of the second photopolymer recording layer;
    (e) laminating the second photopolmyer recording layer with the first photopolymer recording layer to form a two layer laminar photopolyer structure having a Top surface and a bottom surface, wherein the second photopolymer layer is in direct laminar contact with the first photopolymer layer;
    (f) exposing the second photopolymer recording layer to UV light to partially UV harden the second photopolymer recording layer;
    (g) applying a uniform pressure to the top and bottom surfaces of the two layer laminar photopolymer structure, including the steps of
        (i) placing the laminar photopolymer structure into a vacuum bag, and
        (ii) evacuating the vacuum bag;
    (h) baking the two layer laminar photopolymer structure while applying a uniform pressure to the top and bottom surfaces of the two layer laminar photopolymer structure; and
    (i) exposing the two layer laminar photopolymer structure to UV light.

2. The process of claim 1 further comprising the additional steps of:
    (j) exposing a third photopolymer recording layer to hologram forming light;
    (k) exposing the holographically exposed third photopolymer recording layer to UV light for a time interval that is sufficiently short to maintain the tackiness of the third photopolymer recording layer;
    (l) laminating the third photopolymer recording layer onto the two layer laminar photopolymer structure without an intervening adhesive layer to form a three layer laminar photopolymer structure having a top surface and a bottom surface, wherein the third photopolymer layer is in direct laminar contact with one of the first and second photopolymer layers;
    (m) applying a uniform pressure to the top and bottom surfaces of the three layer laminar photopolymer structure;
    (n) baking the three layer laminar photopolymer structure while applying a uniform pressure to the top and bottom surfaces of the three layer laminar photopolymer structure; and
    (o) exposing the three layer laminar photopolymer structure to UV light.

3. A process for making a multilayer photopolyer hologram structure comprising:
    (a) exposing a first photopolymer recording layer to hologram forming light;
    (b) exposing the holographically exposed first photopolymer recording layer to UV light to partially UV harden the photopolymer recording layer;

(c) exposing a second photopolymer recording layer to hologram forming light;

(d) exposing the holographically exposed second photopolymer recording layer to UV light for a time interval that is sufficiently short to maintain the tackiness of the second photopolymer recording layer;

(e) laminating the second photopolymer recording layer onto the first photopolymer recording layer to form a two layer laminar photopolymer structure having a stop surface and a bottom surface;

(f) exposing the second photopolyer recording layer to UV light to partially UV harden the second photopolymer recording layer;

(e) baking the two layer laminar photopolymer structure while applying a uniform pressure to the top and bottom surfaces of the two layer laminar photopolymer structure, including the steps of
  (i) placing the two layer laminar photopolymer structure into a vacuum bag,
  (ii) baking the two layer laminar photopolymer structure, and
  (iii) maintaining a vacuum in the vacuum bag during the step of baking; and (h) exposing the two layer laminar photopolymer structure to UV light.

4. The process of claim 3 further comprising the additional steps of:

(i) exposing a third photopolymer recording layer to hologram forming light;

(j) exposing the holographically exposed third photopolymer recording layer to UV light for a time interval that is sufficiently short to maintain the tackiness of the third photopolymer recording layer;

(k) laminating the third photopolymer recording layer onto the two layer laminar photopolymer structure without an intervening adhesive layer to form a three layer laminar photopolymer structure having a top surface and a bottom surface, wherein the third photopolymer layer is in direct laminar contact with one of the first and second photopolymer layers;

(l) baking the three layer laminar photopolymer structure while applying a uniform pressure to the top and bottom surfaces of the three layer laminar photopolymer structure; and (m) exposing the three layer laminar photopolymer structure to UV light.

* * * * *